(12) United States Patent
Klun et al.

(10) Patent No.: US 11,447,657 B2
(45) Date of Patent: Sep. 20, 2022

(54) COMPOSITIONS INCLUDING ALPHA-ALUMINA PARTICLES AND METHODS OF THEIR USE

(71) Applicant: 3M INNOVATIVE PROPERTIES COMPANY, St. Paul, MN (US)

(72) Inventors: Thomas P. Klun, Lakeland, MN (US); Chunjie Zhang, Shoreview, MN (US); Richard J. Pokorny, Maplewood, MN (US); Benjamin R. Coonce, South St. Paul, MN (US); Benjamin G. Sonnek, Mahtomedi, MN (US); Gregg A. Ambur, River Falls, WI (US); Jung-Sheng Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 106 days.

(21) Appl. No.: 16/757,578

(22) PCT Filed: Dec. 6, 2018

(86) PCT No.: PCT/IB2018/059733
§ 371 (c)(1),
(2) Date: Apr. 20, 2020

(87) PCT Pub. No.: WO2019/116181
PCT Pub. Date: Jun. 20, 2019

(65) Prior Publication Data
US 2020/0354607 A1    Nov. 12, 2020

Related U.S. Application Data

(60) Provisional application No. 62/597,521, filed on Dec. 12, 2017.

(51) Int. Cl.
*C09D 175/14*    (2006.01)
*C08K 3/22*      (2006.01)
*C08G 18/62*     (2006.01)
*C08G 18/78*     (2006.01)
*C08G 18/79*     (2006.01)

(52) U.S. Cl.
CPC ....... *C09D 175/14* (2013.01); *C08G 18/6229* (2013.01); *C08G 18/7831* (2013.01); *C08G 18/792* (2013.01); *C08K 3/22* (2013.01); *C08K 2003/2227* (2013.01); *C08K 2201/003* (2013.01); *C08K 2201/011* (2013.01)

(58) Field of Classification Search
CPC ............. C09D 175/14; C08G 18/6229; C08G 18/7831; C08G 18/792; C08K 3/22; C08K 2003/2227; C08K 2201/003; C08K 2201/011
USPC ........................................................ 524/437
See application file for complete search history.

(56) References Cited

U.S. PATENT DOCUMENTS

| | | | |
|---|---|---|---|
| 2,830,038 A | 4/1958 | Pattison | |
| 3,624,178 A | 11/1971 | Allschell | |
| 4,131,602 A | 12/1978 | Hodakowski | |
| 4,713,138 A | 12/1987 | Ungar | |
| 5,262,198 A * | 11/1993 | Liu | B01D 67/0067 210/490 |
| 5,480,958 A | 1/1996 | Starner | |
| 5,484,853 A | 1/1996 | Chen | |
| 6,699,586 B2 | 3/2004 | Edelmann | |
| 6,750,309 B1 | 6/2004 | Chu | |
| 8,343,622 B2 | 1/2013 | Liu | |
| 8,383,694 B2 | 2/2013 | Klun | |
| 8,431,054 B2 | 4/2013 | Pervan | |
| 8,476,398 B2 | 7/2013 | Klun | |
| 8,628,855 B2 | 1/2014 | Hao | |
| 8,728,623 B2 | 5/2014 | Pokorny | |
| 8,889,801 B2 | 11/2014 | Liap | |
| 9,201,171 B2 | 12/2015 | Inomata | |
| 2005/0276990 A1 * | 12/2005 | Kohara | C23C 28/34 428/469 |
| 2012/0259065 A1 | 10/2012 | Sommer | |
| 2012/0301676 A1 | 11/2012 | Ushida | |
| 2015/0159036 A1 | 6/2015 | Murugesan | |
| 2016/0137879 A1 | 5/2016 | Miki | |
| 2016/0369104 A1 | 12/2016 | Gu | |

FOREIGN PATENT DOCUMENTS

| | | | |
|---|---|---|---|
| CN | 103540183 A * | 1/2014 | |
| CN | 104629576 | 5/2015 | |
| CN | 104629576 A * | 5/2015 | |
| CN | 105385336 | 3/2016 | |

(Continued)

OTHER PUBLICATIONS

Johansson "Influence of Resin Composition on the Defect Formation in Alumina Manufactured by Stereolithography", Materials, Feb. 2017, vol. 10, No. 2, 11 pages.
Material Safety Data Sheet: "Cotronics 700 Series Castable Ceramics", A Product from Cotronics Corporation, Jul. 2009, 2 pages.
Mohanty, "Effect of Alumina Nanoparticles on the Enhancement of Impact and Flexural Properties of the Short Glass/Carbon Fiber Reinforced Epoxy Based Composites", Fibers and Polymers, Mar. 2015, vol. 16, No. 1, pp. 188-195.
Product Information: "AEROXIDE® Alu C", A Product from Evonik Industries, (date unknown but stipulated for this application and its progeny to be prior to the date of the filing of the present application), 1 page.

(Continued)

*Primary Examiner* — Kelechi C Egwim
(74) *Attorney, Agent, or Firm* — Bradford B. Wright (57) ABSTRACT

A curable composition comprises: a) 91 to 98.2 weight percent of: (i) at least one polymerizable compound containing at least one carbamylene group; or (ii) at least one polyurethane precursor system; and b) 0.2 to 9 weight percent of alpha alumina particles having a particle size distribution with a Dv50 of from 0.1 to 1 micron, wherein the weight percentages of a) and b) are based upon the total amount of a) and b). Cured compositions and their use in thermoforming are also disclosed.

10 Claims, 1 Drawing Sheet

(56) References Cited

FOREIGN PATENT DOCUMENTS

| CN | 103540183 | 6/2016 |
|---|---|---|
| CN | 106243964 | 12/2016 |
| WO | WO 98/030625 | 7/1998 |
| WO | WO 2001/030873 | 5/2001 |
| WO | WO 2009/005975 | 1/2009 |
| WO | WO 2014/011731 | 1/2014 |
| WO | WO 2018/147935 | 8/2018 |
| WO | WO 2019/116188 | 6/2019 |

OTHER PUBLICATIONS

Product Information: "Rescor Castable Ceramics", A Product from Cotronics Corporation, (date unknown but stipulated for this application and its progeny to be prior to the date of the filing of the present application), 1 page.
Sadabadi, "High Purity Alpha Alumina Nanoparticle: Synthesis and characterization", International Journal of Scientific & Engineering Research, Apr. 2013, vol. 4, No. 4 pp. 1593-1596.
Sakar, "Preparation and Characterization of Alumina Powder and Suspensions",A Dissertation Submitted to Izmir Institute of Technology Turkey, Sep. 2000, 148 pages.
Wetzel, "Epoxy Nanocomposites—Fracture and Toughening Mechanisms", Science Direct, Nov. 2006, vol. 73, No. 16, pp. 2375-2398.
Zhang, "The Effects of Alumina Nanofillers on Mechanical Properties of High-Performance Epoxy Resin", Journal of Nanoscience and Nanotechnology, Nov. 2010, vol. 10, No. 11, pp. 7526-7532.
International Search Report for PCT International Application No. PCT/IB2018/059733, mailed on Mar. 26, 2019, 5 pages.

* cited by examiner

COMPOSITIONS INCLUDING ALPHA-ALUMINA PARTICLES AND METHODS OF THEIR USE

TECHNICAL FIELD

The present disclosure broadly relates to compositions, curable and cured, containing alpha-alumina particles dispersed in an organic material.

BACKGROUND

Organic polymer films are widely used to provide abrasion resistance to various substrates such as, for example, electronic display glass, eyewear, automotive body panels, and architectural surfaces.

In many cases, the films are thermoformed at some point during their manufacture or application to a substrate; for example, during a thermoforming and injection molding backfill process. However, by their nature thermoformable forms tend to be prone to deformation and/or damage. It would be desirable to have polymer compositions and polymer films with enhanced abrasion resistance.

SUMMARY

Advantageously, and unexpectedly, the present disclosure provides such polymer compositions by including a relatively small amount of sub-micron sized alpha alumina in the polymer compositions.

In one aspect, the present disclosure provides a curable composition comprising components:
a) 91 to 98.2 weight percent of
  (i) at least one polymerizable compound containing at least one carbamylene group; or
  (ii) at least one polyurethane precursor system; and
b) 0.2 to 9 weight percent of alpha alumina particles having a particle size distribution with a Dv50 of from 0.1 to 1 micron, wherein the weight percentages of components a) and b) are based upon the total amount of components a) and b).

In another aspect, the present disclosure provides a polymer composition comprising components:
a) 91 to 98.2 weight percent of at least one polymer comprising a plurality of carbamylene groups; and
b) 0.2 to 9 weight percent of alpha alumina particles having a particle size distribution with a Dv50 of from 0.1 to 1 micron, wherein the weight percentages of components a) and b) are based upon the total amount of components a) and b).

In some preferred embodiments, wherein the polymer composition comprises a film, which may be subjected to a thermoforming process.

As used herein:

The term "carbamylene" refers to the divalent group

The term "polyurethane precursor system" refers collectively to components that can react to form a polyurethane. Examples include combinations of polyisocyanates (or blocked polyisocyanates) and polyols, optionally also including a catalyst (e.g., supplied as a one-part of two-part system).

The term "Dv10" refers to that particle diameter at which 10 percent by volume of the particles in a distribution of particles have that diameter or a smaller diameter.

The term "Dv50" refers to that particle diameter at which 50 percent by volume of the particles in a distribution of particles have that diameter or a smaller diameter.

The term "Dv90" refers to that particle diameter at which 90 percent by volume of the particles in a distribution of particles have that diameter or a smaller diameter.

In the case of alumina particles referred to in the present disclosure, particle size may be determined by laser diffraction (e.g., using a Horiba LA-960 particle size analyzer according to ISO 13320:2009 "Particle size analysis—Laser diffraction methods", International Organization for Standardization, Geneva, Switzerland.

The prefix "(meth)acryl" means "acryl" and/or "methacryl".

The term "particle diameter" refers to the diameter of spherical particles, and the average particle diameter for non-spherical particles.

The term "particle size" refers to particle diameter.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The FIGURE may not be drawn to scale.

DETAILED DESCRIPTION

Curable compositions according to the present disclosure include at least one of: at least one polymerizable compound containing at least one carbamylene group or at least one polyurethane precursor system.

Suitable polymerizable compounds containing at least one carbamylene group may include any polymerizable monomer, oligomer, and/or polymer having at least one carbamylene group. Preferably, at least some of the polymerizable compound(s) have at least two one (preferably at least two) polymerizable groups (e.g., (meth)acryl groups, epoxy groups, isocyanato groups).

Examples of suitable polymerizable compounds include urethane (meth)acrylate oligomers, (meth)acrylated polyurethanes, polyisocyanates (optionally in combination with at least one polyol), and epoxy-functional polyurethanes.

Useful (meth)acrylate monomers (which are preferably non-urethane, and preferably non-silicone, although this is not a requirement) have a (meth)acrylate functionality of 1 to 2. These monomers may function as diluents or solvents, as viscosity reducers, as binders when cured, and as cross-linking agents, for example. Examples of useful (meth)acrylates include mono(meth)acrylates such as octyl (meth)acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl(meth)acrylate, n-butyl (meth)acrylate, methyl (meth)acrylate, hexyl (meth)acrylate, (meth)acrylic acid, stearyl (meth)acrylate, hydroxy functional caprolactone ester (meth)acrylate, isooctyl (meth)

acrylate, hydroxymethyl (meth)acrylate, hydroxypropyl (meth)acrylate, hydroxyisopropyl (meth)acrylate, hydroxybutyl(meth)acrylate, hydroxyisobutyl (meth)acrylate, tetrahydrofurfuryl (meth)acrylate, and alkoxylated versions of the above (meth(acrylate monomers, such as alkoxylated tetrahydrofurfuryl (meth)acrylate and combinations thereof. Tetrahydrofurfuryl (meth)acrylate is preferred in some embodiments; di(meth)acrylates such as 1,6-hexanediol di(meth)acrylate, poly(ethylene glycol) di(meth)acrylates, polybutadiene di(meth)acrylates, polyurethane di(meth) acrylates, ethylene glycol di(meth)acrylate, hexanediol di(meth)acrylate, diethylene glycol di(meth)acrylate, triethylene glycol di(meth)acrylate, tetraethylene glycol di(meth) acrylate, neopentyl glycol di(meth)acrylate, alkoxylated versions of the above di(meth)acrylates, and combinations thereof. Of these, 1,6-hexanediol diacrylate is preferred n some embodiments. (Meth)acrylate monomers having a functionality of 1 or 2 (e.g., as listed above) are widely commercially available.

Exemplary useful silicone (meth)acrylates include mono- and polyfunctional silicone (meth)acrylates. Of these, silicone poly(meth)acrylates may be preferred because the likelihood of unbound silicone (meth)acrylate after curing is generally reduced. Exemplary silicone (meth)acrylates include EBECRYL 350 silicone diacrylate and EBECRYL 1360 silicone hexaacrylate from Allnex, CN9800 aliphatic silicone acrylate and CN990 siliconized urethane acrylate compound from Sartomer Co., and TEGO RAD 2100, TEGO RAD 2250, and TEGO RAD 2500 silicone polyether acrylate from Evonik Industries, Parsippany, N.J.

Examples of commercially available urethane (meth) acrylate oligomers include those available from Sartomer Co., Exton, Pa. as N3D-F130, N3D-I150, M-CURE 203, CN9302, CN9004, CN9005, CN9006, CN9007, CN9023, CN9028, CN9178, CN9290US, CN986, CN989, CN9893, CN996, CN2920, CN3211, CN9001, CN9009, CN9010, CN959, CN9011, CN9062, CN9071, CN9014, CN9070, CN929, CN945A70, CN9025, CN9026, CN962, CN964, CN965, CN968, CN969, CN980, CN981, CN983, CN991, CN2921, CN981B88, CN985B88, CN963B80, CN982B88, CN961H81, CN966H90, CN963A80, CN964A85, CN982A75, CN963E80, CN963J85, CN966J7, CN9013, CN9018, CN9024, CN9030, CN9031, CN9032, CN9039, CN9102, CN9167US, CN9782, CN9783, CN992, CN902J75, CN975, CN972, CN973H85, N970A60, CN971A80, CN973A80, CN970E60, CN973J75, CN971J75, CN9072, CN9014, CN9070, CN966H90, CN966J75, CN9018, CN990, CN1964, CN1963, CN9788, and SARBIO 7402; and those available from Allnex, Frankfurt, Germany, as EBECRYL 220, EBECRYL 221, EBECRYL 230, EBECRYL 246, EBECRYL 271, EBECRYL 1290, EBECRYL 1291, EBECRYL 4100, EBECRYL 4101, EBECRYL 4200, EBECRYL 4201, EBECRYL 4265, EBECRYL 4500, EBECRYL 4587, EBECRYL 4654, EBECRYL 4666, EBECRYL 4738, EBECRYL 4740, EBECRYL 4858, EBECRYL 4859, EBECRYL 5129, EBECRYL 8210, EBECRYL 8296, EBECRYL 8301-R, EBECRYL 8402, EBECRYL 8415, EBECRYL 8465, EBECRYL 8602, EBECRYL 8604, EBECRYL 8702, EBECRYL 8804, EBECRYL 8807, EBECRYL 8810, and EBECRYL 8811.

(Meth)acrylated polyurethanes may be prepared by known methods such as, for example, those described in U.S. Pat. No. 6,750,309 (Chu et al.) and U.S. Pat. No. 4,131,602 (Hodakowski), or obtained from commercial suppliers. These may be obtained as aqueous dispersions, for example, as described in U. S. Pat. Appl. Publ. No. 2012/0259065 A1(Sommer et al.). Aliphatic polyurethane acrylate aqueous dispersions are available from Allnex as UCECOAT 2501, UCECOAT 7571, UCECOAT 7655, UCECOAT 7674, UCECOAT 7689, UCECOAT 7700, UCECOAT 7717, UCECOAT 7734, UCECOAT 7770, UCECOAT 7773, UCECOAT 7788, UCECOAT 7849, UCECOAT 7856, and UCECOAT 7892.

Combinations of urethane (meth)acrylate oligomers and/or (meth)acrylated polyurethanes may also be used.

Polyisocyanates can readily be obtained from a wide array of commercial sources or made by known methods. Examples of commercially available polyisocyanates include those available from Covestro, Pittsburgh, Pa. as DESMODUR E-15, DESMODUR H, DESMODUR HL BA, DESMODUR I, DESMODUR IL BA, DESMODUR IL EA, DESMODUR L 67 BA, DESMODUR L 67 MPA/X, DESMODUR L 75, DESMODUR N 100A, DESMODUR N 3200A, DESMODUR N 3300A, DESMODUR N 3368A BA/SN, DESMODUR N 3390A BA/SN, DESMODUR N 3400, DESMODUR N 3600, DESMODUR N 3790 BA, DESMODUR N 3800, DESMODURN 3900, DESMODUR VP LS 2371, DESMODUR W, DESMODUR XP 2599, DESMODUR Z 4470 BA, DESMODUR Z 4470 MPA/X, and DESMODURZ 4470 SN.

Blocked polyisocyanates, which generate isocyanates upon activation (e.g., heating) may also be used as polyisocyanates. Examples include those available from Chemtura, Middlebury, Conn., as TRIXENE BL 7900, TRIXENE BL 7901, TRIXENE BL 7950, TRIXENE BL 7960, TRIXENE BL 7779, TRIXENE AQUA BL 201, and TRIXENE AQUA BL 220.

Combinations of polyisocyanates and/or blocked polyisocyanates may also be used.

Polyols suitable for reaction with polyisocyanates to form polyurethanes include, for example, straight or branched chain alkane polyols, such as 1,2-ethanediol, 1,3-propanediol, 1,2-propanediol, 1,4-butanediol, 1,3-butanediol, glycerol, neopentyl glycol, trimethylolethane, trimethylolpropane, di-trimethylolpropane, erythritol, pentaerythritol and di-pentaerythritol; polyalkylene glycols, such as di-, tri- and tetraethylene glycol, and di-, tri- and tetrapropylene glycol; cyclic alkane polyols, such as cyclopentanediol, cyclohexanediol, cyclohexanetriol, cyclohexanedimethanol, hydroxypropylcyclohexanol and cyclohexanediethanol; aromatic polyols, such as dihydroxybenzene, benzenetriol, hydroxybenzyl alcohol and dihydroxytoluene; bisphenols, such as 4,4'-isopropylidene-diphenol (bisphenol A); 4,4'-oxybisphenol, 4,4'-dihydroxybenzophenone, 4,4'-thiobisphenol, phenolphthalein, bis(4-hydroxyphenyl)methane (bisphenol F), 4,4'-(1,2-ethenediyl)bisphenol and 4,4'-sulfonylbisphenol; halogenated bisphenols, such as 4,4'-isopropylidenebis(2,6-dibromophenol), 4,4'-isopropylidenebis(2,6-dichlorophenol) and 4,4'-isopropylidenebis(2,3,5,6-tetrachlorophenol); alkoxylated bisphenols, such as alkoxylated 4,4'-isopropylidenediphenol having one or more alkoxy groups, such as ethoxy, propoxy, alpha-butoxy and beta-butoxy groups; and biscyclohexanols, which can be prepared by hydrogenating the corresponding bisphenols, such as 4,4'-isopropylidene-biscyclohexanol, 4,4'-oxybiscyclohexanol, 4,4'-thiobiscyclohexanol and bis(4-hydroxycyclohexanol)methane; higher polyalkylene glycols, such as polyethylene glycols having a number average molecular weight ($M_n$) of from 200 to 2000 grams per mole; hydroxyl-bearing acrylics, such as those formed from the copolymerization of (meth)acrylates and hydroxy functional (meth) acrylates, such as methyl methacrylate and hydroxyethyl methacrylate copolymers; and hydroxy functional polyesters, such as those formed from the reaction of diols, such as butanediol, and diacids or diesters, such as adipic acid or diethyl adipate; and combinations thereof.

Polyols suitable for reaction with polyisocyanates to form polyurethanes include, for example, those commercially available from Covestro as DESMOPHEN 1200 BA, DESMOPHEN 1300 BA, DESMOPHEN 1300 X, DESMOPHEN 1652, DESMOPHEN 650 MPA, DESMOPHEN 651 MPA, DESMOPHEN 670 BA, DESMOPHEN 800, DESMOPHEN 850, DESMOPHEN C 1100, DESMOPHEN C 1200, DESMOPHEN C 2100, DESMOPHEN C 2200, DESMOPHEN C 3100 XP, DESMOPHEN C 3200 XP, DESMOPHEN C XP 2716, DESMOPHEN VP LS 2089, and DESMOPHEN VP LS 2388.

In the case of polyisocyanates, a catalyst may be used to facilitate reaction. Examples include dibutyltin dilaurate, 1,4-diaza[2.2.2]bicyclooctane (DABCO), 1,8-diazabicyclo [5.4.0]undec-7-ene (DBU), bis(dimethylaminoethyl) ether, N,N'-dimethylaminopiperazine, bismuth/zinc catalysts, zinc neodecanoate, bismuth octoate, and combinations thereof.

In the case of isocyanate-functional urethane prepolymers that already include a carbamylene group, a polyamine may also be used to polymerize the prepolymer. Examples include ethyleneamines such as ethylenediamine (EDA), diethylenetriamine (DETA), triethylenetetramine (TETA), tetraethylenepentamine (TEPA), pentaethylenehexamine (PEHA), piperazine, diethylenediamine (DEDA), and 2-amino-1-ethylpiperazine. Further exemplary suitable polyamines include one or more isomers of dialkyl toluenediamine, such as 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, trimethylene glycol di(p-aminobenzoate), and amine-terminated oligomers and prepolymers, 4,4'-methylene-bis (dialkylanilines) (e.g., 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline), 4,4'-methylene-bis(2,6-diethyl-3-chloroaniline), and combinations thereof.

Combinations of polyols and/or polyamines may also be used.

In embodiments in which the least one polyurethane precursor system includes a polyisocyanate and/or a blocked polyisocyanate, it may be formulated as a one-part system (e.g., in the case of blocked polyisocyanates) or as a two-part system (e.g., a Part A containing the polyisocyanate(s) and a Part B, physically isolated from the Part A, containing polyol and/or polyamine and optional catalyst). Other arrangements may also be used.

Examples of epoxy-terminated polyurethane oligomers and polymers include those that can be prepared by can be prepared, for example, by the reaction of glycidol with an isocyanato-terminated urethane prepolymer. Further details for making such compounds can be found, for example, in U.S. Pat. No. 5,480,958 (Starner et al.); U.S. Pat. No. 5,484,853 (Chen et al.); U.S. Pat. No. 3,624,178 (Fatzer et al.); and U.S. Pat. No. 2,830,038 (Pattison).

In those embodiments wherein the polymerizable compound(s) comprises at least one urethane (meth)acrylate monomer, at least one urethane (meth)acrylate oligomer, at least one (meth)acrylated polyurethane, or a combination thereof, free-radical initiator (typically in an effective amount) is preferably added to the curable composition to facilitate polymerization. The free-radical initiator may be a free-radical thermal initiator (i.e., thermally activated) and/ or a free-radical photoinitiator (i.e., activated by absorption of electromagnetic radiation).

By the term "effective amount" is meant an amount that is at least sufficient amount to cause curing of the curable composition under polymerization conditions. Typically, the total amount of initiator (both photoinitiator and thermal initiator) is used in amounts ranging from 0.1 to 10 percent by weight (preferably 1 to 5 percent by weight), based on the total weight of the curable composition, although this is not a requirement.

It will be recognized that curing may be complete even though polymerizable (meth)acrylate groups remain.

Exemplary thermal initiators include organic peroxides (e.g., diacyl peroxides, peroxy ketals, ketone peroxides, hydroperoxides, dialkyl peroxides, peroxy esters, and peroxydicarbonates), azo compounds (e.g., azobis(isobutyronitrile)).

Examples of free-radical photoinitiators include 2-benzyl-2-(dimethylamino)-4'-morpholino-butyrophenone; 1-hydroxycyclohexyl-phenyl ketone; 2-methyl-1-[4-(methylthio)phenyl]-2-morpholino-propan-1-one; 4-methylbenzophenone; 4-phenylbenzophenone; 2-hydroxy-2-methyl-1-phenylpropanone; 1-[4-(2-hydroxyethoxy)-phenyl]-2-hydroxy-2-methylpropanone; 2,2-dimethoxy-2-phenylacetophenone; 4-(4-methylphenylthio) benzophenone; benzophenone; 2,4-diethylthioxanthone; 4,4'-bis(diethylamino)-benzophenone; 2-isopropylthioxanthone; acylphosphine oxide derivatives, acylphosphinate derivatives, and acylphosphine derivatives (e.g., phenylbis (2,4,6-trimethylbenzoyl)phosphine oxide (available as OMNIRAD 819 from IGM Resins, St. Charles, Ill.), phenylbis(2,4,6-trimethylbenzoyl)phosphine (e.g., as available as OMNIRAD 2100 from IGM Resins), bis(2,4,6-trimethylbenzoyl)phenylphosphine oxide, 2,4,6-trimethylbenzoyl-diphenylphosphine oxide (e.g., as available as OMNIRAD 8953X from IGM Resins), isopropoxyphenyl-2,4,6-trimethylbenzoylphosphine oxide, dimethyl pivaloylphosphonate), ethyl (2,4,6-trimethylbenzoyl) phenyl phosphinate (e.g., as available as OMNIRAD TPO-L from IGM Resins); bis (cyclopentadienyl) bis[2,6-difluoro-3-(1-pyrryl)phenyl]titanium (e.g., as available as OMNIRAD 784 from IGM Resins); and combinations thereof.

The curable composition and the polymer composition may contain from 0.2 to 9 weight percent (preferably 0.2 to 3 weight percent) of alpha alumina particles based on the total weight of components a) and b), wherein component a) comprises: (i) at least one polymerizable compound containing at least one carbamylene group; or (ii) at least one polyurethane precursor system in the case of the curable composition; or at least one polymer comprising a plurality of carbamylene groups in the case of the polymer composition, and component b) is alpha alumina particles having a particle size distribution with a Dv50 of from 0.1 to 1 micron. In some preferred embodiments, the alpha alumina particles have a particle size distribution with a Dv50 of 0.15 to 1 micron, or 0.2 to 0.3 micron. In some preferred embodiments, the alpha alumina particles have a polymodal distribution.

The alpha alumina particles comprise, preferably consist essentially of (e.g., are at least 99 weight percent), or even consist of, alumina in its alpha crystalline form. In some preferred embodiments, the alpha alumina particles have a particle size distribution with a Dv50 of greater than or equal to 0.21, 0.23, 0.25, 0.30, 0.40, or even 0.50 micron. In some preferred embodiments, the curable composition and the polymer composition may contain less than 8, 7, 6, 5, 4, 3, or even less than 2 weight percent of alpha alumina particles having a particle size distribution with a Dv50 of from 0.2 to 0.3 micron, based on the total weight of components a) and b).

The alpha alumina particles can be made by milling larger size alpha alumina, for example, using a ball mill or a jet mill. If using a ball mill the milling media preferably comprises, or even consists of, alpha alumina, although other milling media such as, for example, aluminum zirconate media may be used.

Alpha alumina particles, which may even be in the size range of having particle size distribution with a Dv50 of from 0.1 to 1 micron, can be readily obtained from commercial sources. Suppliers include US Research Nanomaterials, Inc., Houston, Tex.; Sisco Research Laboratories Pvt. Ltd., Mumbai, India; and Baikowski International Corp., Charlotte, N.C.

The curable composition and/or the polymer composition may contain additional components such as, for example, fillers, thickeners, thixotropes, fragrance, antioxidant, and UV stabilizers.

In some embodiments, the polymer composition is thermoplastic. In some embodiments, is thermoformable. In some embodiments, the polymer composition comprises at least one crosslinked polymer comprising a carbamylene group.

In many preferred embodiments, the at least one polymer in the polymer composition is not cationic, however, this is not a requirement.

Curable compositions according to the present disclosure may be cured by any suitable means including, for example, heat (e.g., using an oven or infrared heating), mixing (in the case of a two-part polyurethane precursor system), and/or electromagnetic radiation (e.g., ultraviolet and/or visible light) in the case of a photoinitiated system. The selection of cure conditions will be within the capability of one of ordinary skill in the art.

Figure 1:
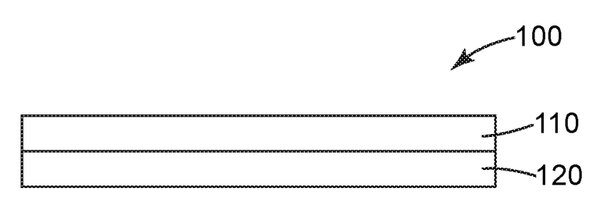
FIG. 1 is a schematic side view of an exemplary composite construction 100 according to the present disclosure.

The polymer composition may have any form. For example, it may be in film form (either as a standalone film or part of a composite film). In some embodiments, as shown in FIG. 1, the polymer composition may be included in a composite construction 100 including a film 110 disposed on a substrate 120. Exemplary substrates include paper, foil, polymer films, fabric, eyewear, windows, and electronic displays.

In some embodiments, the substrate is thermoformable (e.g., under the same forming conditions used to thermoform the polymer composition film. Thermoforming methods are well-known and within the capabilities of one of ordinary skill in the art.

Select Embodiments of the Present Disclosure

In a first embodiment, the present disclosure provides a curable composition comprising components:
  a) 91 to 98.2 weight percent of
    (i) at least one polymerizable compound containing at least one carbamylene group; or
    (ii) at least one polyurethane precursor system; and
  b) 0.2 to 9 weight percent of alpha alumina particles having a particle size distribution with a Dv50 of from 0.1 to 1 micron, wherein the weight percentages of components a) and b) are based upon the total amount of components a) and b).

In a second embodiment, the present disclosure provides a curable composition according to the first embodiment, wherein the at least one polyurethane precursor system comprises a two-part thermosetting polyurethane.

In a third embodiment, the present disclosure provides a curable composition according to the first embodiment, further comprising:
  c) free-radical initiator,
  wherein the at least one polymerizable compound comprises at least one urethane (meth)acrylate monomer, at least one urethane (meth)acrylate oligomer, at least one (meth)acrylated polyurethane, or a combination thereof.

In a fourth embodiment, the present disclosure provides a curable composition according to the third embodiment, wherein said free-radical initiator comprises a free-radical photoinitiator.

In a fifth embodiment, the present disclosure provides a curable composition according to the first to fourth embodiments, wherein the curable composition comprises from 0.2 to 3 weight percent of the alpha alumina particles, based upon the total amount of components a) and b).

In a sixth embodiment, the present disclosure provides a curable composition according to the first to fifth embodiments, wherein the alpha alumina particles have a particle size distribution with a Dv50 of from 0.2 to 0.3 micron.

In a seventh embodiment, the present disclosure provides a curable composition according to the first to sixth embodiments, wherein the alpha alumina particles have a polymodal distribution.

In an eighth embodiment, the present disclosure provides a polymer composition comprising components:
  a) 91 to 98.2 weight percent of at least one polymer comprising a plurality of carbamylene groups; and
  b) 0.2 to 9 weight percent of alpha alumina particles having a particle size distribution with a Dv50 of from 0.1 to 1 micron, wherein the weight percentages of components a) and b) are based upon the total amount of components a) and b).

In a ninth embodiment, the present disclosure provides a polymer composition according to the eighth embodiment, wherein the at least one polymer is covalently crosslinked.

In a tenth embodiment, the present disclosure provides a polymer composition according to the eighth or ninth embodiment, wherein the alpha alumina particles have a particle size distribution with a Dv50 of from 0.2 to 0.3 micron.

In an eleventh embodiment, the present disclosure provides a polymer composition according to any one of the eighth to tenth embodiments, wherein the polymer composition comprises from 0.2 to 3 weight percent of the alpha alumina particles, based upon the total amount of components a) and b).

In a twelfth embodiment, the present disclosure provides a polymer composition according to any one of the eighth to eleventh embodiments, wherein the alpha alumina particles have a polymodal distribution.

In a thirteenth embodiment, the present disclosure provides a polymer composition according to any one of the eighth to twelfth embodiments.

In a fourteenth embodiment, the present disclosure provides a film comprising a polymer composition according to any one of the eighth to thirteenth embodiments, wherein the film is supported on a substrate.

In a fifteenth embodiment, the present disclosure provides a method comprising thermoforming a film according to the thirteenth or fourteenth embodiment.

Objects and advantages of this disclosure are further illustrated by the following non-limiting examples, but the particular materials and amounts thereof recited in these examples, a s well as other conditions and details, should not be construed to unduly limit this disclosure.

EXAMPLES

Unless otherwise noted, all parts, percentages, ratios, etc. in the Examples and the rest of the specification are by weight. Table 1, below, lists various materials used in the Examples.

TABLE 1

| DESIGNATION | DESCRIPTION |
| --- | --- |
| DESN100 | DESMODUR N100 biuret-based hexamethylene diisocyanate oligomer, 100% solids, 22.0 weight percent NCO, 191 g/eq., obtained from Covestro LLC, Pittsburgh, Pennsylvania |
| DESN3300A | DESMODUR N3300A isocyanurate-based hexamethylene diisocyanate oligomer, 100% solids, 21.8 weight percent NCO, 193 g/eq., obtained from Covestro LLC |
| BHT | 2,6-Di-t-butyl-4-methylphenol, available from Aldrich Chemical Co., Milwaukee, Wisconsin |
| 4-hydroxy TEMPO | 4-Hydroxy-2,2,6,6-tetramethylpiperidine-1-oxyl, available from Aldrich Chemical Co. |
| HEA | 2-hydroxyethyl acrylate, obtained from Alfa Aesar,, Ward Hill, Massachusetts |
| PETA | pentaerythritol triacrylate, obtained as SR444C from Sartomer Co., Exton, Pennsylvania |
| HDDA | 1,6-hexanediol diacrylate, obtained from Sartomer Co. |
| MEK | methyl ethyl ketone from Alfa Aesar |
| MP | 1-methoxy-2-propanol |
| PC film | Bisphenol A-based polycarbonate film, 5 mil (0.13 mm) thick, available as LEXAN 8010-112MC film from Sabic Innovative Plastics, Riyadh, Saudi Arabia |
| Release Liner | A3 2-mil (51 microns) release liner available from Nippa, Taichung City, Taiwan |
| ESACURE ONE | photoinitiator, obtained from Lamberti USA, Conshohocken, Pennsylvania |
| SR611 | alkoxylated tetrahydrofurfuryl acrylate monomer from Sartomer Co. |
| SR217 | Cycloaliphatic acrylate monomer from Sartomer Co. |
| HFPO-Urethane | See U.S. Pat. No. 8,728,623 (Pokorny et al.) Col. 15, lines 14-34 for preparation of DES N100/0.95 PET3A/0.10 HFPO—C(=O)NHCH$_2$CH$_2$OH |
| C$_4$F$_9$-acrylate | FBSEA (C$_4$F$_9$SO$_2$N(CH$_3$)CH$_2$CH$_2$OC(=O)CH=CH2) is made by the procedure of Example 2A of PCT Internat. Publ. No. WO 01/30873 (Savu et al.) |
| TEG2100 | TEGORAD 2100 silicone acrylate, obtained from Evonik Industries |
| TEG2250 | TEGORAD 2250 silicone polyether acrylate, obtained from Evonik Industries |
| TEG2500 | TEGORAD 2500 silicone polyether acrylate, obtained from Evonik Industries |
| Capa3031 | Low molecular weight trifunctional caprolactone polyol, obtained from Perstorp Group |
| DBTDL | Dibutyltin dilaurate, obtained from Aldrich Chemical Co., Milwaukee, Wisconsin |
| Celloxide 2010P | Cycloaliphatic epoxide obtained from Daicell USA, Fort Lee, New Jersey |
| Cyracure CPI-6976 | Mixture of aromatic sulfonium PF$_6^-$ salts from Aceto Corporation, Lake Success, New York |
| PET film | SCOTCHPAK PET, 2 mil (0.051 mm) primed polyester film, 3M Company, St. Paul, Minnesota. The coatings were applied on the primed side. |
| 20 nm SiO$_2$ | Prepared according to the procedure on page 14, line 30 to page 15, line 10 of PCT Internat. Publ. No. WO 2014/011731 A1 (Pokorny et al.) |
| Alpha alumina NP | Alpha-Alumina Nano Powder, 99.99% purity, average particle size ~100 nm, surface area 13-15 m$^2$/g, alpha phase, obtained as 26N-0811UPA from Inframat Advanced Materials, Manchester, Connecticut |

Abrasion Test (Eraser Abrasion Test)

Abrasion of film samples was tested downweb to the coating direction using a Taber model 5750 Linear Abraser (Taber Industries, North Tonawanda, N.Y.). The film samples tested were not thermoformed. The collet oscillated at 40 cycles/minute and the length of stroke was 2 inches (5.08 cm). The abrasive material used for this test was an eraser insert (obtained from Summers Optical, a division of EMS Acquisition Corp., Hatfield, Pa.). The eraser insert had a diameter of 6.5 mm and met the requirements of military standard Mil-E-12397B.

The eraser insert was held in place through duration of test by the collet. One sample was tested on three different spots for each example with a weight of 1.1 kg weight and 20 cycles. After abrasion, the sample was cleaned by wiping with a lens cleaning towelette (Radnor Products, Radnor, Pa.). The optical haze and transmission of each sample was measured using a Haze-Gard Plus haze meter (BYK Gardner, Columbia, Md.) at the three different spots. The reported values of haze and transmission are the average of the values obtained on the three different spots. The delta haze value for each sample was calculated by subtracting the haze of an untested region of the sample. The loss of transmission for each sample was calculated by subtracting the transmission after testing from the transmission of an untested region of the sample.

Preparation of Alpha Alumina Nanoparticles (NP)

The alpha alumina nanoparticle dispersions were made through a media milling process. MEK (280 grams), 86 grams of BYK-W 9010 dispersing additive (BYK USA, Wallingford, Conn.), and 418 grams of ultrapure alpha alumina NP were mixed together using a Dispermat CN-10 laboratory high-shear disperser (BYK-Gardner USA, Columbia, Md.). The mixed dispersion was milled in MiniCer laboratory media mill (Netzsch, Exton, Pa.) with 0.2 mm yttria stabilized zirconia milling media. Aliquots (40 grams) were sampled at 10, 20, 30 and 90 min. The solid content of the samples collected at 10, 20, 30 and 90 min was 59.6 weight percent, 60.1 weight percent, 61.1 weight percent and 53.6 weight percent, respectively. 0.2 mL of alpha alumina NP was diluted with 2 mL of MEK prior to particle size analysis by laser diffraction, which was performed on Horiba LA-960. Dv10 means a cumulative 10% point of diameter (or 10% pass particle size). Dv50 means a cumulative 50% point of diameter (or 50% pass particle size), also refer to median diameter. Dv90 means a cumulative 90% point of diameter. The volume average Dv10, Dv50 and Dv90 values (in micrometers, μm) for each filled resin are shown in Table 2, below.

TABLE 2

| PARTICLES | Dv10, microns | Dv50, microns | Dv90, microns |
|---|---|---|---|
| Alpha alumina NP | 1.643 | 4.029 | 8.033 |
| Milled for 30 min | 0.128 | 0.228 | 0.414 |
| Milled for 10 min | 0.133 | 0.234 | 0.402 |
| Milled for 20 min | 0.128 | 0.221 | 0.357 |
| Milled for 90 min | 0.159 | 0.39 | 1.409 |

Thermoforming on Lens Mold

Thermoforming on lens mold was performed using a MAAC sheet feed vacuum thermoforming system (MAAC machinery Corp., Carol Stream, Ill.). The thermoforming system clamped the coated film sheet to be thermoformed, and the sheet was shuttled between top and bottom heating elements to heat the sheet to a temperature of 340° F. (171° C.) to 380° F. (193° C.). The heated sheet was then shuttled over the top of a forming tool with the 8 base lens geometry (length of the mold cavity was 8 mm and the width was 65 mm). The tool was heated to a temperature of 150° F. (66° C.) to 250° F. (121° C.). Then, the tool was raised into the sheet and vacuum was pulled to force the heated sheet to form to the 8 base lens tool geometry.

Hardcoats on thermoplastic films were assessed for their thermoformability, by thermoforming them into a lens shape and determining the amount of cracking of the hardcoat from the edges of the lens shape to the center of the lens shape. The most preferred embodiments exhibit no cracking anywhere on the lens shape. If the coating on the lens shape cracked, the crack usually started on the edge. The percent crack from the edge was measured from the edge of the lens to the center of the lens. For example, if a crack started at the edge and continued 20% of the distance between the edge and the center of the lens shape, then cracking was reported as 20% from the edge. If cracks were present half way between the edge and the center, the crack level was recorded as 50% crack up from the edge. The percentage location was measured visually with an un-aided eye.

| RATING SCALE FOR THE AMOUNT OF CRACKS | |
|---|---|
| none = | no cracks |
| very slight = | 1-3 cracks |
| slight = | 4-10 cracks |
| slight cracking = | few cracks observed and the distance from crack to crack was relatively large (>6 mm). |

Thermoforming on 1-Mm Edge Aluminum Phone Mold

Thermoforming on a one-millimeter edge aluminum phone mold was performed on Hytech AccuForm IL50. The mold has a generic phone shape, with 1 mm radii on four edges. The four corners of the top surface where the films are formed have radii of 0.1 in (2.54 mm), 0.15 in (3.81 mm), 0.25 in (6.35 mm), and 0.5 in (12.7 m), respectively. The thermoforming conditions include heated platen temperature of 350° F. (177° C.), mold temperature of 80° F. (27° C.), preheat time of 6 seconds, preheat pressure of 60 psi and form time of 6 seconds.

The thermoformed samples were rated as "no cracks", "cracks at edge only" and "cracks across surface". "Cracks at the edge only" means cracking developed around the bottom of the sample where the bottom of the mold was. It does not necessary mean the cracks were on the actual usable part of the thermoformed samples.

Static Water Contact Angle Measurement

Static water contact angle was measured on KRÜSS Drop Shape Analyzer DSA100, Kruss Gmbh, Hamburg, Germany. Water (5 microliters) was transferred onto the surface, and the static water contact angle was obtained through analyzing the image. Three measurements were performed on different locations on the surface and the average value and standard deviation were calculated.

Crosshatch Adhesion Test

Crosshatch adhesion of each sample was measured using the ASTM D3359-09, "Standard Test Methods for Measuring Adhesion by Tape Test", Test Method B using 3M 893 filament tape (3M Company, St. Paul, Minn.).

Preparative Example 1 (PE1)

A 250-mL jar equipped with a magnetic stir bar was charged with 39.76 g (0.2082 eq.) of DESN100, 25 g of MEK, 12.33 g (0.1062 eq.) of HEA, 47.91 g (0.1062 eq.) of PETA, for a total of 1.01 eq. OH per eq. of NCO, 0.025 g (250 ppm) BHT, 0.005 g (50 ppm) of 4-hydroxy TEMPO, and 0.05 g (500 ppm) of DBTDL. The jar was placed in a water bath at room temperature and allowed to stir for 10 min. After 10 min., it was placed into a 55° C. bath for 4 hr. At the end of that time, the reaction mixture was monitored by FTIR and found to have no NCO peak at 2265 cm$^{-1}$. The resulting material was 80 weight percent solids.

Preparative Examples PE2-PE8 (PE2-PE8)

PE2-PE14 were prepared in the same manner as PE1 described above by reacting the preparations reported in Table 3. The reactions were carried out using an appropriately sized jar. The amount of materials used in preparations described in Table 3 were reported in grams (g), and, unless noted otherwise, further included 250 ppm BHT, 50 ppm 4-hydroxy TEMPO, and 500 ppm DBTDL with respect to solids. The resulting products were 80 weight percent solids in MEK.

TABLE 3

| PREPARATIVE EXAMPLE | DESCRIPTION | ISOCYANATE, g | HEA, g | PETA, g | MEK, g | AVERAGE (METH)ACRYLATE FUNCTIONALITY OF URETHANE (METH)ACRYLATE COMPOUND |
|---|---|---|---|---|---|---|
| PE1 | 1.0 DESN100 + 0.5 HEA + 0.5 PETA | DESN100, 39.76 | 12.33 | 47.91 | 25 | 7.2 |
| PE2 | 1.0 DESN100 + PETA | DESN100, 29.32 |  | 70.68 | 25 | 10.8 |
| PE3 | 1.0 DESN100 + 0.25 HEA + 0.75 PETA | DESN100, 33.75 | 5.23 | 61.01 | 25 | 9 |
| PE4 | 1.0 DESN100 + 0.75 HEA + 0.25 PETA | DESN100, 48.37 | 22.5 | 29.14 | 25 | 5.4 |
| PE5 | 1.0 DESN3300 + 1.0 PETA | DESN3300, 29.5 |  | 70.50 | 25 | 10.5 |
| PE6 | 1.0 DESN3300 + 0.5 HEA + 0.5 PETA | DESN3300, 95.99 | 29.47 | 114.54 | 60 | 7 |
| PE7 | 1.0 DESN100 + 1.0 HEA | DESN100, 61.96 | 38.04 |  | 25 | 3.6 |
| PE8 | 1.0 DESN3300 + 1.0 HEA | DESN3300, 62.16 | 37.84 |  | 25 | 3.5 |

The average (meth)acrylate functionality is calculated in the following fashion. The functionality of the added acrylates for each compound is first calculated. For instance, the PE3 in Table 3 above is designated as 1.0 DESN100+0.25 HEA+0.75 PETA. This means that the compound is the reaction product of 1 equivalent of isocyanate groups (as DESN100) and 0.25 hydroxyl equivalents of hydroxyethyl acrylate and 0.75 hydroxyl equivalents of PETA. The HEA has one acrylate group per hydroxyl group and the PETA has 3 acrylate groups per hydroxyl group. The functionality of added acrylates for this compound is then (0.25×1)+(0.75×3)=2.5. The average (meth)acrylate functionality is found by multiplying the functionality of the added acrylates for each compound by the average functionality of the polyisocyanate. According to Covestro, the average functionality for DESN100 is 3.6, so the average (meth)acrylate functionality for the compound is at 2.5×3.6=9.

By this method, average functionality of polyisocyanates for DESN3300, DESN3800, and DESZ4470BA are 3.5, 3.0, and 3.3, respectively.

Comparative Examples CPEX1-CPEX8

Coating solutions were prepared by mixing components as reported in Table 4. Then, to prepare each preparative example, the indicated coating solution composition in Table 4 was coated at 32 weight percent solids onto PC film. In Table 5, the identity of the Preparative Example Oligomer is reported for each Preparative Hard Coated Film. The coating was done using a No. 7 wire-wound rod (available from RD Specialties, Webster, N.Y., nominal wet film thickness 0.63 mils (16.0 microns)) and dried at 80° C. for 1.5 min. The dried coating was then cured using a UV processor equipped with an H-type bulb (500W, available from Heraeus Noblelight America/Fusion UV Systems, Gaithersburg, Md.) at 100% power under nitrogen at 30 feet/minute (12.1 m/min). The cured coating had an estimated thickness of about 3.4 microns.

TABLE 4

| COMPARATIVE EXAMPLES CPEX1-CPEX8 | CHARGE, g | SOLIDS, g | SOLVENT | WEIGHT PERCENT SOLIDS | WEIGHT PERCENT OF COATING SOLUTION |
|---|---|---|---|---|---|
| PREPARATIVE EXAMPLE OLIGOMER | 9.33 | 7.464 | 1.866 | 93.3 | 37.32 |
| HDDA | 0.16 | 0.16 |  | 2.00 | 0.64 |
| SR611 | 0.16 | 0.16 |  | 2.00 | 0.64 |
| TEG2100 | 0.056 | 0.056 |  | 0.70 | 0.22 |
| ESACURE ONE | 0.16 | 0.16 |  | 2.00 | 0.64 |
| MP | 15.134 |  | 15.134 | 0.00 | 60.54 |

TABLE 5

| COMPARATIVE EXAMPLE HARD COATED FILMS | PREPARATIVE EXAMPLE OLIGOMER |
|---|---|
| CPEX1 | PE1 |
| CPEX2 | PE2 |
| CPEX3 | PE3 |
| CPEX4 | PE4 |
| CPEX5 | PE5 |
| CPEX6 | PE6 |
| CPEX7 | PE7 |
| CPEX8 | PE8 |

Thermoforming of the Comparative Examples CPEX1-CPEX8 to generate thermoformed CPEX9-CPEX16 was performed using a MAAC sheet feed vacuum thermoforming system (MAAC Machinery Corp., Carol Stream, Ill.). The thermoforming system clamped the coated film sheet to be thermoformed, and the sheet was shuttled between top and bottom heating elements to heat the sheet to a temperature of 340° F. (171° C.) to 380° F. (193° C.). The heated sheet was then shuttled over the top of a forming tool with the 8 base lens geometry (length of the mold cavity was 8 mm and the width was 65 mm). The tool was heated to a temperature of 150° F. (66° C.) to 250° F. (121° C.). Then, the tool was raised into the sheet and vacuum was pulled to force the heated sheet to form to the 8 base lens tool geometry.

Test results for films used for thermoforming are reported in Table 6, below.

TABLE 6

| FILM USED | INITIAL HAZE, haze units | ABRASION TEST A % HAZE, % | TRANSMISSION AFTER ABRASION TEST, % | % LOSS IN TRANSMISSION AFTER ABRASION TEST, % | ADHESION TEST RATING |
|---|---|---|---|---|---|
| CPEX1 | 0.17 | 5.09 | 90.9 | 1.8 | 5B |
| CPEX2 | 0.1 | 3.68 | 90.9 | 1.8 | 5B |
| CPEX3 | 0.13 | 4.13 | 90.9 | 1.9 | 5B |
| CPEX4 | 0.12 | 10.08 | 90.7 | 2.1 | 5B |
| CPEX5 | 0.13 | 4.43 | 90.8 | 1.8 | 5B |
| CPEX6 | 0.12 | 7.14 | 90.7 | 2 | 5B |
| CPEX7 | 0.15 | 15.25 | 90.6 | 2.3 | 5B |
| CPEX8 | 0.15 | 21.15 | 90.4 | 2.3 | 5B |

Thermoforming results are reported in Table 7, below.

TABLE 7

| EXAMPLE | FILM USED FOR THERMOFORMING | THERMOFORMING RESULTS |
|---|---|---|
| CPEX9 | CPEX1 | cracks at edge only |
| CPEX10 | CPEX2 | cracks 30% up from edge |
| CPEX11 | CPEX3 | cracks 25% up from edge |
| CPEX12 | CPEX4 | cracks at edge only |
| CPEX13 | CPEX5 | cracks 25% up from edge |
| CPEX14 | CPEX6 | cracks at edge only |
| CPEX15 | CPEX7 | no cracks |
| CPEX16 | CPEX8 | no cracks | perature. The formulations were hand-coated on PC film using a #12 wire-wound rod (available from RD Specialties, nominal wet film thickness 1.08 mils (27.4 microns)). The coated PC films were allowed to dry at room temperature first and then dried at 80° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 30 feet/min (12.1 m/min).

The results of thermoforming of hardcoated PC films on lens mold following a described procedure are also reported in Table 9. Haze and transmission before and after eraser abrasion tests were measured on hardcoated PC films and results are reported in Table 10.

TABLE 8

| FORMULATION | FORMULATION A, g | SR611, g of 32 weight percent solution | 20 nm SiO$_2$, g | ETHANOL, g | SiO$_2$ % of Total solids | TOTAL SOLIDS, % |
|---|---|---|---|---|---|---|
| CPEX17 | 4.50 | 0.25 | 0.00 | 0.00 | 0.0 | 32.1 |
| CPEX18 | 4.50 | 0.25 | 0.38 | 0.16 | 10.1 | 32.1 |
| CPEX19 | 4.50 | 0.25 | 0.85 | 0.35 | 20.1 | 32.1 |
| CPEX20 | 4.50 | 0.25 | 1.50 | 0.60 | 30.7 | 32.1 |
| CPEX21 | 4.50 | 0.25 | 2.30 | 0.92 | 40.4 | 32.1 |

Preparation of Formulation A

Formulation A was made by adding 0.64 g of photoinitiator ESACURE ONE and 0.32 g of TEG2100 to 34.80 g of PE1 (80 weight percent in MEK), followed by dilution with 48 g of ethanol and 6.0 g of 1-methoxy-2-propanol. The resulting Formulation A had 32.1 weight percent solids.

Formulation A was used to make coating formulations in Table 8. In Table 8, SR611 was diluted to 32 weight percent solids in ethanol. Formulations in Table 8 were made by mixing the indicated amounts of ingredients at room tem-

TABLE 9

| EXAMPLE | FORMULATION | THERMOFORMING RESULTS ON LENS MOLD |
|---|---|---|
| CPEX22 | CPEX17 | no cracking |
| CPEX23 | CPEX18 | cracks 20% up on edge, slight |
| CPEX24 | CPEX19 | cracks 20% up on edge, slight |
| CPEX25 | CPEX20 | cracks 25% up on edge |
| CPEX26 | CPEX21 | cracks 30% up on edge |

TABLE 10

| EXAMPLE | % HAZE | | | % TRANSMISSION | | |
|---|---|---|---|---|---|---|
| | Initial | Abraded | Δ % Haze | Initial | Abraded | Δ % Transmission |
| PC film | 0.07 | 46.7 | 46.63 | 90.6 | 90.4 | −0.2 |
| CPEX22 | 0.19 | 9.83 | 9.64 | 91.3 | 91.1 | −0.2 |
| CPEX23 | 0.81 | 11.20 | 10.39 | 91.3 | 91.1 | −0.2 |
| CPEX24 | 0.55 | 12.60 | 12.05 | 91.4 | 91.2 | −0.2 |
| CPEX25 | 0.37 | 5.57 | 5.20 | 91.5 | 91.5 | 0 |
| CPEX26 | 0.27 | 4.45 | 4.18 | 91.6 | 91.6 | 0 |

Formulation A was used to make coating formulations as reported in Table 11. SR611 in Table 11 was diluted to 32 weight percent solids in ethanol.

EX1-EX5, CPEX27-CPEX31 were prepared using the 30 min milled alpha alumina nanoparticle dispersion prepared hereinabove with a concentration of 61.1 weight percent solids in MEK. EX6, EX7 and EX8 were prepared using 10 min, 20 min, and 90 min milled alpha alumina nanoparticle dispersion prepared hereinabove, respectively. Alpha alumina nanoparticle dispersions used in EX6, EX7 and EX8 were 59.6 weight percent, 60.1 weight percent and 53.6 weight percent solids in MEK, respectively. EX1-EX8 and CPEX27-CPEX31 were made by mixing different amounts of prepared solutions of ingredients at room temperature. The formulations were hand-coated on PC film using a #12 wire-wound rod (RD Specialties, Webster, N.Y., 0.30 mm nominal wet thickness). The coated PC films were allowed to dry at room temperature first and then dried at 80° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 30 feet/min (12.1 m/min).

The results of thermoforming of hardcoated PC films on lens mold following a described procedure are reported in Table 12. The haze and transmission of the hardcoated PC films before and after eraser abrasion tests were measured and results are reported in Table 13.

TABLE 11

| FORMULATION | FORMULATION A, g | SR611, g of 32 weight percent solution in ethanol | ALPHA ALUMINA NANOPARTICLES, g of dispersion in MEK | ALUMINA SOLIDS/TOTAL SOLIDS, % | ETHANOL, g | TOTAL SOLIDS, Wt. % |
|---|---|---|---|---|---|---|
| CPEX27 | 2.25 | 0.13 | 0.000 | 0.0 | 0.00 | 32.1 |
| EX1 | 2.25 | 0.13 | 0.015 | 1.2 | 0.01 | 32.1 |
| EX2 | 2.25 | 0.13 | 0.032 | 2.5 | 0.03 | 32.1 |
| EX3 | 2.25 | 0.13 | 0.066 | 5.0 | 0.05 | 32.2 |
| EX4 | 2.25 | 0.13 | 0.094 | 7.0 | 0.08 | 32.2 |
| EX5 | 2.25 | 0.13 | 0.123 | 9.0 | 0.10 | 32.2 |
| CPEX28 | 2.25 | 0.13 | 0.139 | 10.0 | 0.12 | 32.2 |
| CPEX29 | 2.25 | 0.13 | 0.312 | 20.0 | 0.27 | 32.2 |
| CPEX30 | 2.25 | 0.13 | 0.535 | 30.0 | 0.48 | 32.1 |
| CPEX31 | 2.25 | 0.13 | 0.835 | 40.0 | 0.74 | 32.2 |
| EX6 | 2.25 | 0.13 | 0.033 | 2.5 | 0.02 | 32.2 |
| EX7 | 2.25 | 0.13 | 0.032 | 2.5 | 0.02 | 32.2 |
| EX8 | 2.25 | 0.13 | 0.037 | 2.5 | 0.02 | 32.2 |

TABLE 12

| EXAMPLE | FORMULATION | THERMOFORMING RESULTS ON LENS MOLD |
|---|---|---|
| CPEX32 | CPEX27 | cracks 25% up on edge, slight |
| EX9 | EX1 | cracks 25% up on edge, slight |
| EX10 | EX2 | cracks 20% up on edge, very slight |
| EX11 | EX3 | cracks 10% up on edge, slight |
| EX12 | EX4 | not evaluated |
| EX13 | EX5 | not evaluated |
| CPEX33 | CPEX28 | cracks 25% up on edge, slight |
| CPEX34 | CPEX29 | cracks 20% up on edge, slight |
| CPEX35 | CPEX30 | cracks 25% up on edge |
| CPEX36 | CPEX31 | cracks 25% up on edge |
| EX14 | EX6 | cracks 20% up on edge |
| EX15 | EX7 | cracks 20% up on edge, slight |
| EX16 | EX8 | cracks 20% up on edge, slight |

TABLE 13

| EXAMPLE | % HAZE | | | % TRANSMISSION | | |
|---|---|---|---|---|---|---|
| | Initial | Abraded | Δ % Haze | Initial | Abraded | Δ Transmission |
| CPEX32 | 0.21 | 5.87 | 5.66 | 91.3 | 91.3 | 0.0 |
| EX9 | 2.13 | 7.60 | 5.47 | 91.1 | 91.0 | −0.1 |
| EX10 | 3.00 | 7.80 | 4.80 | 91.0 | 91.0 | 0.0 |
| EX11 | 6.16 | 11.20 | 5.04 | 90.7 | 90.7 | 0.0 |
| EX12 | 7.71 | 13.70 | 5.99 | 90.5 | 90.6 | 0.1 |
| EX13 | 11.00 | 17.40 | 6.40 | 90.4 | 90.3 | −0.1 |
| CPEX33 | 13.40 | 18.50 | 5.10 | 90.5 | 90.5 | 0.0 |
| CPEX34 | 33.90 | 41.50 | 7.60 | 89.6 | 89.7 | 0.1 |
| CPEX35 | 40.40 | 39.20 | −1.20 | 89.0 | 89.3 | 0.3 |
| CPEX36 | 37.80 | 40.30 | 2.50 | 88.4 | 88.9 | 0.5 |
| EX14 | 4.51 | 9.84 | 5.33 | 91.2 | 91.1 | −0.1 |
| EX15 | 3.28 | 8.89 | 5.61 | 91.3 | 91.2 | −0.1 |
| EX16 | 2.92 | 7.31 | 4.39 | 91.4 | 91.4 | 0.0 |

Preparation of Formulation B

Formulation B was made by adding 0.64 g of photoinitiator ESACURE ONE to 34.80 g of PE1 (80 weight percent in MEK), followed by dilution with 48 g of ethanol and 6.0 g of 1-methoxy-2-propanol. The resulting Formulation B had 31.8 weight percent of solids.

Examples EX17-EX22 and Comparative Example CPEX37

Formulation B was used to make coating formulations in Table 14. SR611 in Table 14 was diluted to 32 weight percent solids in ethanol. Alpha alumina nanoparticles used in Table 14 were used at a concentration of 61.1 weight percent solids in MEK. CPEX 37 and EX17-EX22 were made by mixing different amounts of prepared solutions of ingredients shown in Table 14 at room temperature. The formulations were hand-coated on PC film using a #12 wire-wound rod (available from RD Specialties, nominal wet film thickness 1.08 mils (27.4 microns)). The coated PC films were allowed to dry at room temperature first, and then dried at 90° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 30 feet/min (12.1 m/min).

The results of thermoforming of the hardcoated PC films on lens mold following a described procedure are reported in Table 15. The haze and transmission of the hardcoated PC films before and after eraser abrasion tests were measured and results are reported in Table 16.

Examples EX29-EX32 and Comparative Example CPEX39

To make CPEX39 and EX29-EX32, a master Formulation C was first prepared by adding 0.64 g of photoinitiator ESACURE ONE to 34.80 g of urethane acrylate PE1 (80 weight percent in MEK), followed by dilution with 54.0 g of MEK. The resulting Formulation C has 31.8 weight percent of solid. Formulation C was used to make coating formulations in Table 17. SR611 in Table 17 was diluted to 32 weight percent solids in MEK. Alpha alumina nanoparticle dispersion was used at a concentration of 61.1 weight percent solids in MEK, which was prepared by milling commercially available alpha alumina particles following a described procedure. CPEX39 and EX29-EX32 were made by mixing different amounts of prepared solutions of ingredients shown in Table 17 at room temperature. The formu-

TABLE 14

| EXAMPLE | FORMULATION B (31.8 wt. % solids), g | SR611 (32 wt. % in ethanol), g | ALPHA ALUMINA NANOPARTICLES (61.1 wt. % in MEK, 30 min milled), g | TEG2100 (10 wt. % in ethanol), g | TEG2250 (10 wt. % in ethanol), g | TEG 2500 (10 wt. % in ethanol), g | HFPO-Urethane (30 wt. % solids), g | ALPHA ALUMINA, % of Total Solids | TEGORAD, % of Total Solids | HFPO, % of Total Solids | TOTAL SOLIDS % |
|---|---|---|---|---|---|---|---|---|---|---|---|
| CPEX37 | 2.25 | 0.13 | 0.000 | 0.000 | 0.000 | 0.000 | 0.000 | 0.0 | 0.0 | 0.0 | 31.8 |
| EX17 | 2.25 | 0.13 | 0.032 | 0.000 | 0.000 | 0.000 | 0.000 | 2.5 | 0.0 | 0.0 | 32.3 |
| EX18 | 2.25 | 0.13 | 0.032 | 0.080 | 0.000 | 0.000 | 0.000 | 2.5 | 1.0 | 0.0 | 31.6 |
| EX19 | 2.25 | 0.13 | 0.032 | 0.000 | 0.080 | 0.000 | 0.000 | 2.5 | 1.0 | 0.0 | 31.6 |
| EX20 | 2.25 | 0.13 | 0.032 | 0.000 | 0.000 | 0.080 | 0.000 | 2.5 | 1.0 | 0.0 | 31.6 |
| EX21 | 2.25 | 0.13 | 0.032 | 0.000 | 0.000 | 0.000 | 0.025 | 2.5 | 0.0 | 1.0 | 32.3 |
| EX22 | 2.25 | 0.13 | 0.032 | 0.080 | 0.000 | 0.000 | 0.026 | 2.5 | 1.0 | 1.0 | 31.6 |

TABLE 15

| EXAMPLE | FORMULATION | THERMOFORMING RESULTS ON LENS MOLD |
|---|---|---|
| CPEX38 | CPEX37 | cracks 20% up on edge, slight |
| EX23 | EX17 | cracks on edge only |
| EX24 | EX18 | cracks 20% up on edge, slight |
| EX25 | EX19 | cracks 15% up on edge, slight |
| EX26 | EX20 | no cracking |
| EX27 | EX21 | cracks are slight and 100% covered by pit marks |
| EX28 | EX22 | cracks 20% up on edge, slight | lations were hand-coated on PET film using a #12 wire-wound rod (available from RD Specialties, nominal wet film thickness 1.08 mils (27.4 microns)). The coated PET film were allowed to dry at room temperature first and then dried at 90° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 50 feet/min (15.2 m/min). The formulations and resultant hardcoated PET films are reported in Table 18. The eraser abrasion test was performed and results are reported in Table 19.

TABLE 16

| | % HAZE | | | % TRANSMISSION | | | STATIC WATER |
|---|---|---|---|---|---|---|---|
| EXAMPLE | Initial | Abraded | Δ % Haze | Initial | Abraded | Δ Transmission | CONTACT ANGLE, ° |
| CPEX38 | 0.15 | 4.57 | 4.42 | 91.5 | 91.7 | 0.2 | 67.3 ± 1.3 |
| EX23 | 3.29 | 7.18 | 3.89 | 91.3 | 91.2 | −0.1 | 68.2 ± 1.0 |
| EX24 | 3.13 | 7.39 | 4.26 | 91.3 | 91.3 | 0.0 | 97.8 ± 1.7 |
| EX25 | 3.35 | 8.31 | 4.96 | 91.3 | 91.3 | 0 | 98.2 ± 3.8 |
| EX26 | 3.60 | 10.80 | 7.20 | 91.3 | 91.0 | −0.3 | 99.1 ± 1.4 |
| EX27 | 3.22 | 9.39 | 6.17 | 91.4 | 91.3 | −0.1 | 103.6 ± 2.7 |
| EX28 | 2.96 | 9.63 | 6.67 | 91.3 | 91.3 | 0 | 109.6 ± 2.2 |

TABLE 17

| EXAMPLE | FORMULATION C (31.8 wt. % solids), g | SR611 (32 wt. % in ethanol), g | ALPHA ALUMINA NANOPARTICLES (61.1 wt. % in MEK, 30 min milled), g | TEG2100 (10 wt. % in ethanol), g | HFPO-Urethane (30 wt. % solids), g | ALPHA ALUMINA, % of Total Solids | TEGORAD, % of Total Solids | HFPO, % of Total Solids | TOTAL SOLIDS % |
|---|---|---|---|---|---|---|---|---|---|
| CPEX39 | 6.75 | 0.39 | 0.000 | 0.000 | 0.000 | 0.0 | 0.0 | 0.0 | 31.8 |
| EX29 | 6.75 | 0.39 | 0.096 | 0.000 | 0.000 | 2.5 | 0.0 | 0.0 | 32.3 |
| EX30 | 6.75 | 0.39 | 0.096 | 0.120 | 0.000 | 2.5 | 0.5 | 0.0 | 32.0 |
| EX31 | 6.75 | 0.39 | 0.096 | 0.000 | 0.038 | 2.5 | 0.0 | 0.5 | 32.3 |
| EX32 | 6.75 | 0.39 | 0.097 | 0.120 | 0.038 | 2.5 | 0.5 | 0.5 | 32.0 |

TABLE 18

| EXAMPLE | FORMULATION |
|---|---|
| CPEX40 | CPEX39 |
| EX33 | EX29 |
| EX34 | EX30 |
| EX35 | EX31 |
| EX36 | EX32 | lations were hand-coated on PET film using a #12 wire-wound rod (available from RD Specialties, nominal wet film thickness 1.08 mils (27.4 microns)). After drying at room temperature, the coated samples were cured in an oven at 80° C. for 30 min.

The formulations and resultant hardcoated PET films are reported in Table 21. The haze and transmission of the hardcoated PET films before and after eraser abrasion tests were measured and results are reported in Table 22.

TABLE 20

| EXAMPLE | DESN100, g | Capa3031, g | DBTDL (3 wt. % in 1,3-pentanedione), g | ALPHA ALUMINA NANOPARTICLES (61.1 WT. % in MEK, 30 min milled), g | MEK, g | % ALUMINA IN TOTAL SOLIDS | TOTAL SOLIDS, % |
|---|---|---|---|---|---|---|---|
| CPEX41 | 3.873 | 2.029 | 0.098 | 0.000 | 12.450 | 0.0 | 32.0 |
| EX37 | 3.873 | 2.029 | 0.098 | 0.248 | 12.700 | 2.5 | 32.0 |
| EX38 | 3.873 | 2.029 | 0.098 | 0.510 | 12.900 | 5.0 | 32.0 |

TABLE 19

| | % HAZE | | | % TRANSMISSION | | |
|---|---|---|---|---|---|---|
| EXAMPLE | Initial | Abraded | Δ % Haze | Initial | Abraded | Δ Transmission |
| CPEX40 | 0.50 | 8.56 | 8.06 | 90.5 | 90.0 | −0.5 |
| EX33 | 3.21 | 8.51 | 5.30 | 89.9 | 90.0 | 0.1 |
| EX34 | 3.40 | 9.14 | 5.74 | 90.0 | 90.0 | 0.0 |
| EX35 | 3.42 | 8.84 | 5.42 | 90.0 | 90.0 | 0.0 |
| EX36 | 3.65 | 8.53 | 4.88 | 90.0 | 90.0 | 0.0 |

TABLE 21

| EXAMPLE | FORMULATION |
|---|---|
| CPEX42 | CPEX41 |
| EX39 | EX37 |
| EX40 | EX38 |

TABLE 22

| | % HAZE | | | % TRANSMISSION | | |
|---|---|---|---|---|---|---|
| EXAMPLE | Initial | Abraded | Δ % Haze | Initial | Abraded | Δ Transmission |
| CPEX42 | 0.40 | 10.40 | 10.00 | 90.0 | 90.0 | 0.0 |
| EX39 | 4.22 | 13.70 | 9.48 | 89.7 | 89.7 | 0.0 |
| EX40 | 7.23 | 13.10 | 5.87 | 89.3 | 89.4 | 0.1 |

Examples EX37-EX38 and Comparative Example CPEX41

Alpha alumina nanoparticles were added to crosslinked polyurethane coatings. Alpha alumina nanoparticle dispersion was used at a concentration of 61.1 weight percent solids in MEK, which was prepared by milling commercially available alpha alumina particles following a described procedure. CPEX41, EX37 and EX38 were made by mixing different amounts of prepared solutions of ingredients shown in Table 20 at room temperature. The formu- Examples EX41-EX44 and Comparative Examples CPEX43-CPEX44

Alpha alumina nanoparticles were added to crosslinked epoxy coatings. Alpha alumina nanoparticle dispersion was used at a concentration of 61.1 weight percent solids in MEK, which was prepared by milling commercially available alpha alumina particles following the procedure described hereinabove.

CPEX43, CPEX44, EX41-EX44 were made by mixing different amounts of prepared solutions of ingredients shown in Table 23 at room temperature. The formulations were hand-coated on PET film using a #12 wire-wound rod (available from RD Specialties, nominal wet film thickness 1.08 mils (27.4 microns)). The samples were first dried in air at room temperature and then cured using a UV processor equipped with a D-type bulb (Heraeus Noblelight America/Fusion UV Systems, Gaithersburg, Md.) at 100% power under nitrogen purge at 30 feet/min (12.1 m/min). The UV cured samples were further cured in an oven at 100° C. for 30 min.

The formulations and resultant hardcoated PET films are reported in Table 24. The haze and transmission before and after eraser abrasion tests were measured and results are reported in Table 25.

TABLE 23

| EXAMPLE | CELLOXIDE, g | CAPA 3031, g | CYRACURE CPI-6976, g | ALPHA ALUMINA NANOPARTICLES (61.1 WT. % in MEK, 30 min milled), g | MEK, g | % ALUMINA IN TOTAL SOLIDS | TOTAL SOLIDS, % |
|---|---|---|---|---|---|---|---|
| CPEX43 | 4.000 | 0.000 | 0.040 | 0.000 | 8.50 | 0.00 | 32.06 |
| EX41 | 4.000 | 0.000 | 0.040 | 0.169 | 8.66 | 2.50 | 32.04 |
| EX42 | 4.000 | 0.000 | 0.040 | 0.346 | 8.80 | 5.00 | 32.09 |
| CPEX44 | 2.800 | 1.200 | 0.040 | 0.000 | 8.50 | 0.00 | 32.06 |
| EX43 | 2.800 | 1.200 | 0.040 | 0.169 | 8.66 | 2.50 | 32.04 |
| EX44 | 2.800 | 1.200 | 0.040 | 0.346 | 8.80 | 5.00 | 32.09 |

TABLE 24

| EXAMPLE | FORMULATION |
|---|---|
| CPEX45 | CPEX43 |
| EX45 | EX41 |
| EX46 | EX42 |
| CPEX46 | CPEX44 |
| EX47 | EX43 |
| EX48 | EX44 |

TABLE 25

| | % HAZE | | | % TRANSMISSION | | |
|---|---|---|---|---|---|---|
| EXAMPLE | Initial | Abraded | Δ % Haze | Initial | Abraded | Δ Transmission |
| CPEX45 | 0.58 | 34.0 | 33.42 | 90.3 | 90.3 | 0.0 |
| EX45 | 3.68 | 35.5 | 31.82 | 89.9 | 90.1 | 0.2 |
| EX46 | 6.28 | 37.6 | 31.32 | 89.7 | 89.7 | 0.0 |
| CPEX46 | 1.15 | 51.9 | 50.75 | 90.3 | 90.5 | 0.2 |
| EX47 | 3.70 | 51.4 | 47.70 | 90 | 90.1 | 0.1 |
| EX48 | 6.94 | 50.4 | 43.46 | 89.7 | 89.9 | 0.2 |

Preparation of Optically Clear Adhesive (OCA)

The optically clear adhesive used in making the multilayer articles containing hardcoats was prepared as follows. 80 g of 2-ethylhexyl acrylate (Sigma-Aldrich, St. Louis, Mo.), 10 g of 2-ethylhexyl methacrylate (Sigma-Aldrich), 4 g of hydroxyethyl acrylate (Kowa America, New York, N.Y.), 6 g of acrylamide (Zibo Xinye Chemical, Zibo City, China), 0.15 g of thermal initiator Vazo52 (E. I. du Pont de Nemours & Co., Wilmington, Del.), 0.08 g of Karenz MT PE1 (Showa Denko America, New York, N.Y.), and 60 g of MEK solvent were charged to a reactor vessel. The vessel was purged with nitrogen for 5 minutes, sealed, and then placed in an agitated water bath at 60° C. for 20 hours. The generated solution polymer was then cooled, purged with air for 10 minutes, and 0.3 g of isocyanatoethyl methacrylate (Showa Denko America) was added to the vessel. The vessel was again sealed and heated to 50° C. for 12 hours to allow for the IEM to react with pendant OH functionality on the formed acrylic polymer. Following this functionalization, 0.4 g of IRGACURE 184 (BASF, Florham Park, N.J.), 1 g of SR351 (Sartomer Co., Exton, Pa.), 25 grams of 2-methoxypropanol (Alfa Aesar, Ward Hill, Mass.), and 3.3 grams of methanol were added to the vessel and mixed for 1 hour.

The resultant optically clear adhesive was applied onto PET film using a notched bar coater with the slot size set between size 0.003 in (0.08 mm) and 0.004 in (0.10 mm) followed by baking in an oven for 10 min at 70° C. The resulting adhesive-coated PET film was used in making the multilayer articles along with the hardcoated PET film. The thickness of the adhesive on PET film was determined as 135.7±1.5 microns using a digital thickness gauge after photo curing of the multilayer article.

Four different hardcoats were applied on PET film for making the multilayer articles.

Formulation C was used to make coating formulations in Table 26. SR611 in Table 26 was diluted to 32 weight percent solids in MEK. Alpha alumina nanoparticle dispersion was used at a concentration of 61.1 weight percent solids in MEK, which was prepared by milling commercially available alpha alumina particles as described hereinabove.

Example EX32 and Comparative Example CPEX47

EX32 and CPEX47 were made by mixing different amounts of prepared solutions of ingredients shown in Table 26 at room temperature. The formulations were hand-coated on PET film using a #12 wire-wound rod (available from RD Specialties, nominal wet film thickness 1.08 mils (27.4 microns)). The coated PET films were allowed to dry at room temperature first and then dried at 90° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 50 feet/min (15.2 m/min). The formulations and resultant hardcoated PET films as well as abrasion test results are reported in Table 27.

TABLE 26

| EXAMPLE | FORMULATION C (32.1 wt. %), g | SR611 (32 wt. %), g | ALPHA ALUMINA NANOPARTICLES (61.1 wt.%, 30 min milled), g | TEGORAD 2100 (g, 10 wt. %) | HFPO-Urethane (g, 30 wt. %) | ALUMINA Solid % in Total Solid | TEGORAD Solids % in Total Solid | HFPO Solid % in Total Solid | Total Solid % |
|---|---|---|---|---|---|---|---|---|---|
| EX32 | 6.75 | 0.39 | 0.097 | 0.120 | 0.038 | 2.5 | 0.5 | 0.5 | 32.0 |
| CPEX47 | 2.25 | 0.13 | 0 | 0.08 | 0.025 | 0 | 1.0 | 0.96 | 31.4 |

TABLE 27

| | | % HAZE | | | % TRANSMISSION | | |
|---|---|---|---|---|---|---|---|
| EXAMPLE | FORMULATION | Initial | Abraded | Δ % Haze | Initial | Abraded | Δ Transmission |
| EX36 | EX32 | 3.65 | 8.53 | 4.88 | 90.0 | 90.0 | 0.0 |
| CPEX48 | CPEX47 | 0.58 | 8.44 | 7.86 | 90.2 | 90.3 | 0.1 |

To make the formulation for CPEX49, Formulation D was first prepared by adding 0.32 g of photoinitiator ESACURE ONE to 17.40 g of the mixture of PE2 (80 weight percent in MEK) and 0.16 g of Tegorad 2100, followed by dilution with 27 g of MEK. The resulting Formulation D has 32.1 weight percent of solids.

Formulation D was used to make CPEX49 in combination with other listed ingredients in Table 28. SR611 was diluted to 32 weight percent solids in MEK. Tegorad 2100 was diluted to 10 weight percent solids in MEK and HFPO-Urethane had 30 weight percent solids in MEK. CPEX49 was prepared at room temperature and hand-coated on PET film using a #12 wire-wound rod (available from RD Specialties, nominal wet film thickness 1.08 mils (27.4 microns)). The coated PET films were allowed to dry at room temperature first and then dried at 90° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 50 feet/min (15.2 m/min). The PET film coated with CPEX49 is labeled as CPEX50. The eraser abrasion test was performed following the described procedure and results are reported in Table 29.

Comparative Example 51

To make CPEX51, Formulation E was first prepared by adding 0.32 g of photoinitiator ESACURE ONE to the mixture of 17.40 g of PE3 (80 weight percent in MEK) and 0.16 g of Tegorad 2100, followed by dilution with 27 g of MEK. The resulting Formulation E has 32.1 weight percent of solid.

Formulation E was used to make CPEX51 in combination with other listed ingredients in Table 30. SR611 was diluted to 32 weight percent solids in MEK. Tegorad 2100 was diluted to 10 weight percent solids in MEK and HFPO-Urethane had 30 weight percent solids in MEK. CPEX51 was prepared at room temperature and hand-coated on PET film using a #12 wire-wound rod (available from RD Specialties, nominal wet film thickness 1.08 mils (27.4 microns)). The coated PET films were allowed to dry at room temperature first and then dried at 90° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 50 feet/min (15.2 m/min). The PET film coated with CPEX51 is labeled as CPEX52. The eraser abrasion test was performed following the described procedure and results are reported in Table 31.

TABLE 28

| EXAMPLE | FORMULATION D (32.1 wt. %), g | SR611 (32 wt. %), g | TEGORAD 2100 (g, 10 wt. %) | HFPO-Urethane (g, 30 wt. %) | TEGORAD/HFPO-Urethane Solids % in Total Solid | Total Solid % |
|---|---|---|---|---|---|---|
| CPEX49 | 9 | 0.52 | 0.32 | 0.1 | 2.81 | 31.4 |

TABLE 29

| | | % HAZE | | | % TRANSMISSION | | |
|---|---|---|---|---|---|---|---|
| EXAMPLE | FORMULATION | Initial | Abraded | Δ % Haze | Initial | Abraded | Δ Transmission |
| CPEX50 | CPEX49 | 0.94 | 6.4 | 5.46 | 90.3 | 90.2 | −0.1 |

TABLE 30

| EXAMPLE | FORMULATION E (32.1 wt. %), g | SR611 (32 wt. %), g | TEGORAD 2100 (g, 10 wt. %) | HFPO-Urethane (g, 30 wt. %) | TEGORAD/HFPO-Urethane Solids % in Total Solid | Total Solid % |
|---|---|---|---|---|---|---|
| CPEX51 | 9 | 0.52 | 0.32 | 0.1 | 2.81 | 31.4 |

TABLE 29

| | | % HAZE | | | % TRANSMISSION | | |
|---|---|---|---|---|---|---|---|
| EXAMPLE | FORMULATION | Initial | Abraded | Δ % Haze | Initial | Abraded | Δ Transmission |
| CPEX52 | CPEX51 | 0.96 | 7.21 | 6.25 | 90.4 | 90.4 | 0.0 |

Multilayer Article Construction Procedure

Two different multilayer articles, Construction 1 and Construction 2, were laminated by hand using the hardcoated PET film (EX36, CPEX48, CPEX50, CPEX52), adhesive coated PET film and a release liner. Construction 1 has four layers of materials from the top surface to the bottom, namely hardcoat, PET film, adhesive and release liner. Construction 2 has six layers of materials from the top surface to the bottom, namely hardcoat, PET film, adhesive, PET film, adhesive and release liner.

To make construction 1, the release liner was coated with adhesive using a notched bar coater with the slot size set between 0.003 in (0.08 mm) and 0.004 in (0.10 mm) followed by baking in an oven for 10 min at 70° C. The PET side of the hardcoated PET film was laminated onto the adhesive coated release liner using a rubber hand roller. Air bubble and defects were carefully avoided by applying tension on the hardcoated PET film during lamination. The adhesive of laminated articles was cured with 2 passes using a UV processor equipped with a D-type bulb (600W, Heraeus Noblelight America/Fusion UV Systems, Gaithersburg, Md.) at 50% power in air at 15 feet/min (4.6 m/min). The curing was performed through the release liner.

To make construction 2, the adhesive was first coated on PET film using a notched bar coater with the slot size set between 0.003 in and 0.004 in (0.08 mm-0.10 mm) followed by baking in an oven for 10 min at 70° C. The PET side of the hardcoated PET film was laminated onto the adhesive coated PET film. Air bubble and defects were carefully avoided by applying tension on the hardcoated PET film during lamination. This results in an intermediate article hardcoat/PET/adhesive/PET. The release liner was coated with adhesive using a notched bar coater with the slot size set between 0.003 in and 0.004 in (0.08 mm-0.10 mm) followed by baking in an oven for 10 min at 70° C. The PET side of the hardcoat/PET/adhesive/PET was laminated onto the adhesive coated release liner using a rubber hand roller. Air bubble and defects were carefully avoided by applying tension on the hardcoat/PET/adhesive/PET during lamination.

The adhesive of laminated articles was cured with 2 passes using a UV processor equipped with a D-type bulb (600W, Heraeus Noblelight America/Fusion UV Systems, Gaithersburg, Md.) at 50% power in air at 15 feet/min (4.6 m/min). The curing was performed through the release liner.

Examples 49-50 and Comparative Examples CPEX50-CPEX58

Thermoforming of multilayer articles of Construction 1 and Construction 2 was performed on 1 mm edge aluminum phone mold following a described procedure. The hardcoated PET films used in making the multilayer articles were also thermoformed under the same conditions. The thermoforming results are reported in Table 32.

TABLE 32

| EXAMPLE | HARD-COATED FILM | MULTILAYER CONSTRUCTION | THERMOFORMING ON 1 MM-EDGE ALUMINUM PHONE MOLD | REMARKS |
|---|---|---|---|---|
| EX49 | EX36 | Construction 1 | cracks at edge only | replicate 1 |
| | EX36 | Construction 1 | cracks at edge only | replicate 2 |
| EX50 | EX36 | Construction 2 | no cracks | replicate 1 |
| | EX36 | Construction 2 | no cracks | replicate 2 |
| CPEX53 | CPEX48 | Construction 1 | no cracks | replicate 1 |
| | CPEX48 | Construction 1 | cracks at edge only | replicate 2 |
| CPEX54 | CPEX48 | Construction 2 | no cracks | replicate 1 |
| CPEX55 | CPEX50 | Construction 1 | cracks across surface | replicate 1 |
| | CPEX50 | Construction 1 | cracks at edge only | replicate 2 |
| CPEX56 | CPEX50 | Construction 2 | cracks across surface | replicate 1 |
| CPEX57 | CPEX52 | Construction 1 | cracks at edge only | replicate 1 |
| | CPEX52 | Construction 1 | cracks at edge only | replicate 2 |
| CPEX58 | CPEX52 | Construction 2 | cracks across surface | replicate 1 |
| | CPEX52 | Construction 2 | cracks across surface | replicate 2 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising components:
    a) 97 to 99.8 weight percent of:
        at least one polymerizable compound containing at least one carbamylene group;
        and
    b) 0.2 to 3 weight percent of alpha alumina particles having a particle size distribution with a Dv50 of from 0.1 to 1 micron, wherein the weight percentages of components a) and b) are based upon the total amount of components a) and b); and
    c) free-radical initiator,
    wherein the at least one polymerizable compound comprises at least one urethane (meth)acrylate monomer, at least one urethane (meth)acrylate oligomer, at least one (meth)acrylated polyurethane, or a combination thereof.

2. The curable composition of claim 1, wherein said free-radical initiator comprises a free-radical photoinitiator.

3. The curable composition of claim 1, wherein the alpha alumina particles have a particle size distribution with a Dv50 of from 0.2 to 0.3 micron.

4. The curable composition of claim 1, wherein the alpha alumina particles have a polymodal distribution.

5. A polymer composition comprising components:
    a) 97 to 99.8 weight percent of at least one polymer comprising a plurality of carbamylene groups, wherein the at least one polymer is covalently crosslinked; and
    b) 0.2 to 3 weight percent of alpha alumina particles having a particle size distribution with a Dv50 of from 0.1 to 1 micron, wherein the weight percentages of components a) and b) are based upon the total amount of components a) and b).

6. The polymer composition of claim 5, wherein the alpha alumina particles have a particle size distribution with a Dv50 of from 0.2 to 0.3 micron.

7. The polymer composition of claim 5, wherein the alpha alumina particles have a polymodal distribution.

8. The polymer composition of claim 5, wherein the polymer composition comprises a film.

9. The polymer composition of claim 8, wherein the film is supported on a substrate.

10. A method comprising thermoforming the film of claim 8.

* * * * *